United States Patent [19]
Peng

[11] Patent Number: 5,315,428
[45] Date of Patent: May 24, 1994

[54] OPTICAL SCANNING SYSTEM COMPRISING OPTICAL CHOPPER

[75] Inventor: Ke- Ou Peng, Delft, Netherlands

[73] Assignee: Opticon Sensors Europe B.V., Hoofddorp, Netherlands

[21] Appl. No.: 9,810

[22] Filed: Jan. 27, 1993

[30]  Foreign Application Priority Data

Jan. 28, 1992 [EP] European Pat. Off. ......... 92200241.5

[51] Int. Cl.[5] .............................. G02B 26/08
[52] U.S. Cl. .................... 359/216; 359/219; 250/233; 250/236
[58] Field of Search .............. 359/216, 217, 218, 219, 359/209, 211, 232, 234, 235, 236; 250/232, 233, 235, 236

[56]  References Cited

U.S. PATENT DOCUMENTS

| | | | |
|---|---|---|---|
| 3,399,590 | 9/1968 | Johnson, Jr. et al. | 359/218 |
| 4,003,627 | 1/1977 | Wu et al. | 359/219 |
| 4,018,504 | 4/1977 | Wu et al. | 359/219 |
| 4,795,224 | 1/1989 | Goto | 359/211 |

FOREIGN PATENT DOCUMENTS

| | | | |
|---|---|---|---|
| 2757235 | 7/1979 | European Pat. Off. | G06K 7/10 |
| 0402952 | 12/1990 | European Pat. Off. | G06K 7/10 |
| 0444958 | 9/1991 | European Pat. Off. | G06K 7/10 |

Primary Examiner—Loha Ben
Attorney, Agent, or Firm—Parmelee, Bollinger & Bramblett

[57]  ABSTRACT

Optical scanning system to scan a code on an object comprising a laser source (1), a laser beam shaper (2) receiving a laser beam from the laser source and focussing the laser beam on the object, a mirror polygon (4) having facets (6–9), of which at least one is reflective, and being rotated by a motor (5), a mirror array (10) surrounding the polygon arranged in such a way that the laser beam will generate a scanning pattern (3) on the code to be detected, and a detector (24) receiving the light scattered by the object, in which system the mirror array (10) is substantially entirely surrounding the polygon (4); the polygon (4) is designed to perform an optical chopper function, in such a way that during one rotation cycle of the polygon (4) each mirror (11-22; 61-75) of the mirror array (10) will at least once receive the laser beam and generate its own scanning line.

11 Claims, 10 Drawing Sheets

OPTICAL SCANNING SYSTEM COMPRISING OPTICAL CHOPPER

BACKGROUND OF THE INVENTION

The present invention relates to an optical scanning system to scan a code on an object comprising a laser source, a laser beam shaper receiving a laser beam from the laser source and focussing the laser beam on the object, a mirror polygon having at least two facets, of which at least one is reflective, and being rotated by a motor, a mirror array surrounding the polygon over at least half a circle and arranged in such a way that the laser beam after being reflected by the rotating polygon and by the mirrors of the mirror array will generate a scanning pattern on the code to be detected, and a detector receiving the light scatterred by the object.

Such an optical scanning device may be used as a bar code reader and is known from EP-A-0.375.340. The known device comprises a laser tube generating a laser beam, a beam shaper, at least one reflecting mirror that directs the laser beam to a polygon rotated by a motor and a mirror array of, for instance, three mirrors. The laser beam reflected from the rotary polygon is directed to the mirror array generating one scanning line per mirror on the bar code to be read. Every scanning line has its own direction. The polygon has, for instance, five facets. So, every turn of the entire polygon corresponds with five groups of three scanning lines. Depending on the angle of inclination of the polygon facets these groups might be in different planes. In the arrangement of EP-A-0.375.340 the mirror array can only be set up in at most half a circle around the polygon, thus limiting the maximum number of mirrors to be installed in the mirror array, and therefore limiting the number of scanning lines to be generated on the bar code.

DE-A-3.602.008 shows a bar code reading device comprising a polygon mirror, some facets of which might be flat, concave or convex. To every facet corresponds a separate plane in which a laser beam being reflected by this facet and afterwards focussed by a hollow, focussing mirror, is entirely focussed. Therefore, the depth of field in which a bar code can be read is increased. However, no use is made of a mirror array. So, no scanning lines with different orientations are generated, thereby limiting the number of possible orientations of the bar code to be read.

U.S. Pat. No. 4,450,350 shows a bar code reading device comprising at least one rotating polygon and a mirror array. One of the objects of this patent is to generate a multi-line scanning pattern on a bar code, in which the scanning speed is more than twice the rotating speed of the polygon. The mirrors of the mirror array are installed in at most half a circle around the polygon, thereby limiting the number of possible orientations of the scanning lines of the scanning pattern.

SUMMARY OF THE INVENTION

The object of the invention is to provide an optical scanning device comprising a mirror array installed along an entire circle around a polygon in which each of these mirrors generates a separate scanning line on the code to be read.

In the scanning system according to the present invention the mirror array substantially entirely surrounds the polygon and the polygon is designed to perform an optical chopper function, in such a way that during one rotation cycle of the polygon each mirror of the mirror array will at least once receive the laser beam and, therefore, will support at least once during the cycle the generation of a scanning line in the scanning pattern.

The main advantage of the device according to the invention is that a greater number of mirrors of the mirror array around the polygon may be installed than in prior art scanning devices, thereby increasing the maximum number of scanning lines to be generated on the code to be read during every rotation cycle of the polygon. Therefore, the change a code on an object may be detected is increased, because there are more possible orientations in which one of the scanning lines scans the entire code.

In a first embodiment of the invention the polygon comprises four facets, two of which being opposite to each other may directly reflect the laser beam impinging upon the polygon to a first part of mirrors of the mirror array, whereas the other two facets also opposing each other comprise a passage way through which the laser beam passes when being directed to them, after which the laser beam will be reflected backwards by a first additional mirror means to one of the other two facets to scan the remaining mirrors of the mirror array.

In an other embodiment of the present invention the polygon comprises four facets, two of which being opposite to each other may directly reflect the laser beam impinging upon the polygon to a first part of mirrors of the mirror array, whereas the other two facets also opposing each other will reflect the impinging laser beam to a second additional mirror means, reflecting the laser beam to the remaining mirrors of the mirror array.

In another embodiment of the present invention a beam splitter is provided, separating the laser beam incident from the beam shaper into a first and a second separated laser beam, the first laser beam after being reflected by a third additional mirror being directed to the polygon from a first direction to scan a first part of mirrors of the mirror array and the second laser beam after being reflected by a fourth additional mirror being directed to the polygon from a second direction to scan the remaining mirrors of the mirror array.

Such a scanning system has the advantage of generating an entirely symmetric scanning pattern.

In another embodiment of the present invention the polygon has four facets and is provided with an optical disc, which disc comprises two opposing reflecting parts corresponding to two facets of the polygon and two transparent parts corresponding to the other two facets of the polygon, the system furthermore comprising a fifth and a sixth additional mirror to support the scanning of a first part of mirrors of the mirror array when a laser beam is reflected by one of the reflecting parts of the optical disc and comprising a seventh and an eighth additional mirror to support the scanning of the remaining mirrors of the mirror array when the laser beam passes through one of the transparent parts of the optical disc.

In another embodiment of the present invention the polygon comprises three facets and is provided with an optical disc rotating with the same speed as the three facets, of which at least one is reflective, a first part of the disc being reflective, covering roughly $2\pi/3$ of the disc and corresponding to one of the facets, the remaining part of the disc being transparent, the system furthermore comprising additional mirrors to support subsequent scanning of the mirrors of the mirror array be means of the facets of the polygon.

In another embodiment of the present invention the polygon comprises three facets, of which at least one is reflective, and the polygon has an upper and bottom surface both comprising reflective parts covering roughly one third of the entire upper and bottom surface, respectively, while the polygon comprises a through hole through the upper and bottom surface, the system furthermore comprising additional mirrors to support subsequent scanning of mirrors of the mirror array by means of the three facets of the polygon.

BRIEF DESCRIPTION OF THE DRAWINGS

The above features and advantages of the present invention will become more apparent from the description below, refering to the drawing showing some, but not limiting, examples of preferred embodiments of the present invention.

In the drawing.

DETAILED DESCRIPTION OF THE EMBODIMENTS

Figure 1:
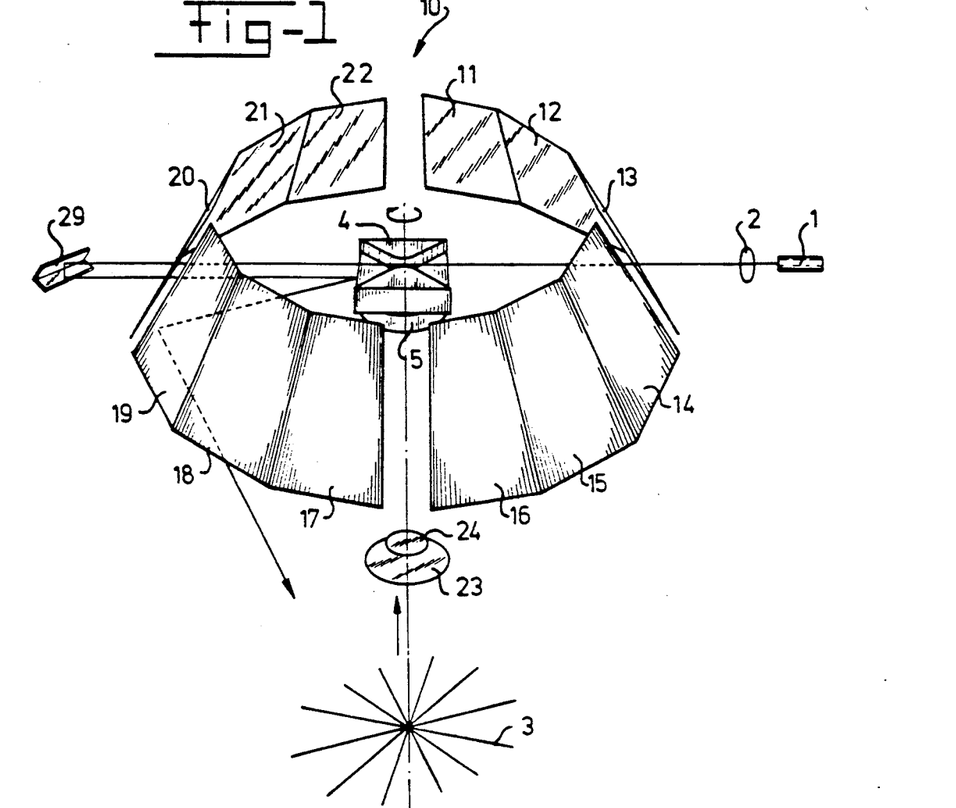
FIG. 1 shows an optical beam scanner according to the invention having unsymmetrical geometry.
Figure 1A:
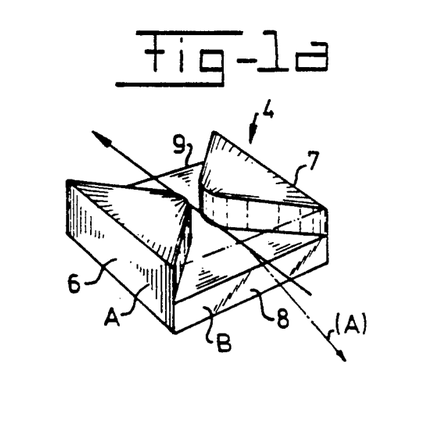
FIG. 1a shows a first embodiment of an optical chopper according to the invention.

In FIG. 1 and 1a the most simple embodiment of the present invention is shown. A laser source 1, e.g. a laser diode, generates a laser beam, which is directed to a beam shaper 2. The focussed laser beam from the beam shaper 2 propagates to a rotating polygon 4, driven by a motor 5. The polygon is preferred to have four facets 6, 7, 8, and 9 as is more clearly indicated in the enlarged view of the polygon 4 in FIG. 1a. The four facets are preferrably classified into two types: facets 6 and 7 are of type A, whereas facets 8 and 9 are of type B. When a facet of type A is directed to the incoming laser beam the laser beam will be reflected in the direction of one of the mirrors 11-16 of mirror array 10. The mirrors of mirror array 10 are all inclined with respect to the facet planes of the polygon 4. The laser beam reflected from one of the facets of type A will then be reflected by one of the mirrors 11-16 in the direction of the bar code. The laser beam will write a scanning line on the bar code, one line for every mirror. So, a multi-directional scanning pattern 3, depending on the number of polygon facets, the number of mirrors of the mirror array and the angle of inclination of all reflecting surfaces, will be generated.

If, however, one of the facets of type B is directed to the laser beam from the beam shaper, initially the laser beam will pass through the polygon and will not be reflected from the polygon, as is indicated in FIG. 1. Then, the laser beam will pass through an aperture between two mirrors 19 and 20 of the mirror array and will be reflected backwards by mirror 29. As can be seen from FIG. 1 mirror or prism 29 comprises two mirror facets arranged in such a way, that the laser beam will impinge upon both of them in such a way that the reflected laser beam is substantially parallel to the incoming laser beam. Then, the laser beam will pass again through the aperture between mirrors 19 and 20 and impinge upon the under-part of a polygon facet of type B having a reflecting surface. In this case the laser beam will be reflected to one of the mirrors 17-22 of mirror array 10, generating another scanning pattern 3 on the bar code to be read.

The laser beam scattered by the bar code will be collected by a collecting lens 23 and detected by a photo-sensor 24, forming part of a detecting device (not shown) that detects the bar code. Such detecting devices are known in the art and are no part of the present invention.

In the embodiment of FIG. 1 it is possible to utilize a mirror array 10 arranged in an entire circle surrounding the polygon, whereas prior art optical scanners using a polygon and a mirror array could only utilize a mirror array in at most half a circle. Thus, the scanning device according to the present invention extends the number of possible scanning lines and scanning line orientations.

Because the laser beam reflected by facets 8 and 9 via mirror or prism 29 to the bar code has a longer propagation distance, as compared with the beam directly reflected by facets 6 and 7, the two laser beams, focussed by optics 2, cannot be focussed on the same object plane. In other words, there are two scanning planes in which either of the laser beams reflected from the two types of facets A or B, respectively, will be focussed sharply. In order to keep the two planes coincident with each other, additional (negative) optics may be inserted in the propagation path via mirror or prism 29.

Figure 2:
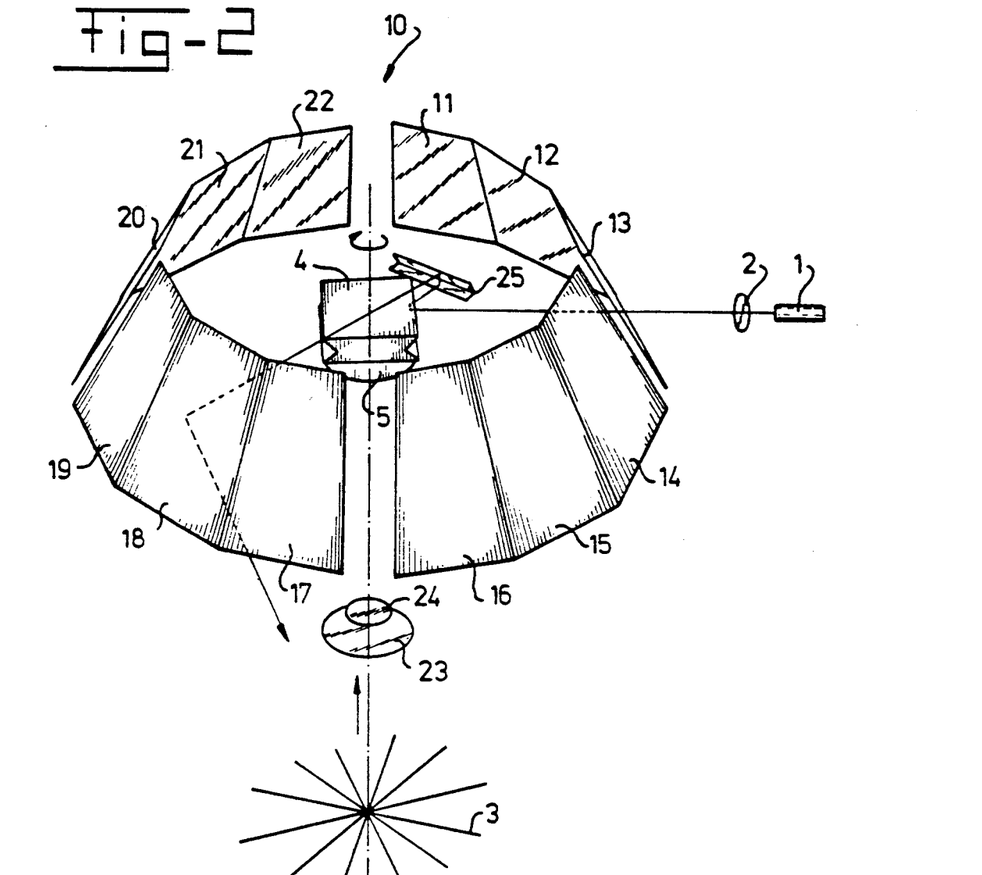
FIG. 2 shows another optical beam scanner according to the invention having unsymmetrical geometry.

The geometry without using additional compensating optics can be slightly improved by using the geometry of FIG. 2. In the arrangement of FIG. 2 instead of the polygon-reflector combination 4, 29 another polygon-reflector combination 4, 25 is used. Again, two types of facets are utilized in the polygon: two of the facets are of type A being entirely flat, whereas two facets of type B consist of two reflecting parts intersecting each other under a predetermined angle.

When a laser beam impinges upon a facet of type A the device will function in the same way as the device of FIG. 1 in case a laser beam impinges upon a type A facet. This case needs no further explanation.

Figure 2A:
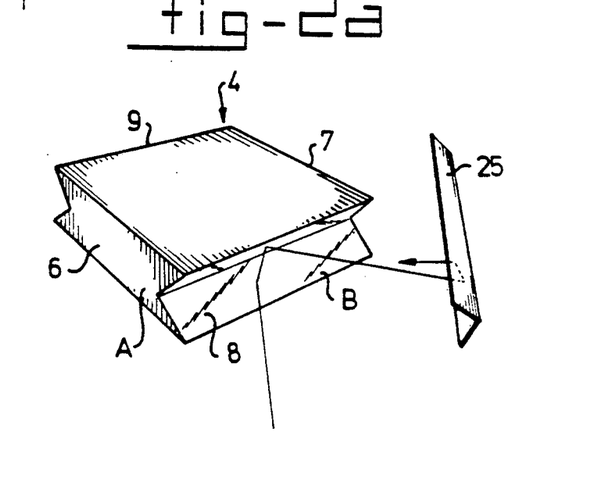
FIGS. 2a, 2b, 2c and 2d show polygons to be used in the optical beam scanner of FIG. 2.
Figure 2B:
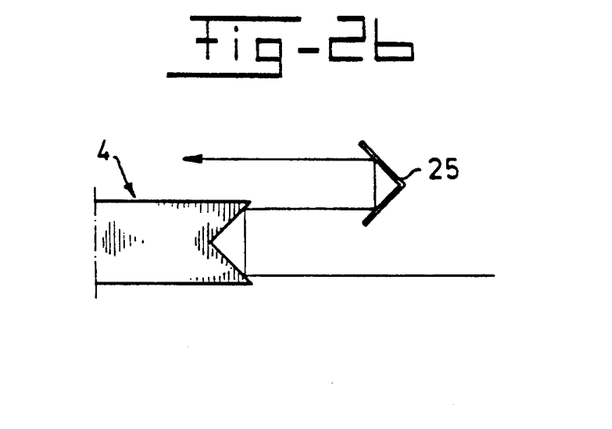

When a laser beam impinges upon a type B facet (see FIGS. 2a and 2b) the laser beam is reflected backwards to mirror 25. In the preferred embodiment the reflected laser beam is in a plane perpendicular to the axis of motor 5, this plane being parallel to another plane perpendicular to the axis of motor 5 and comprising the line along which the laser beam propagates from beam shaper 2. The laser beam reflected from a type B facet is being reflected again by a mirror or prism 25 comprising two reflecting facets intersecting each other under a predetermined angle. As with the reflection by the type B facets the laser beam is raised again in another plane perdicular to the axis of motor 5, in such a way that the reflected laser beam may now propagate above the polygon 4. Then, the laser beam will be reflected by one of the mirrors 17-22 of mirror array 10 in the direction of the bar code to be read.

Figure 2C:
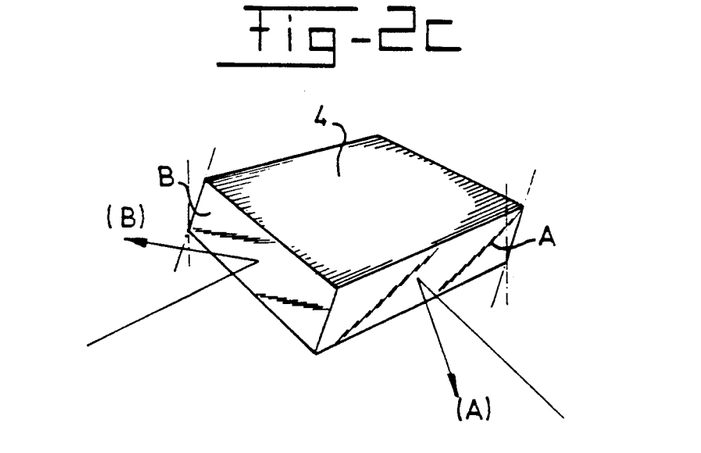
Figure 2D:
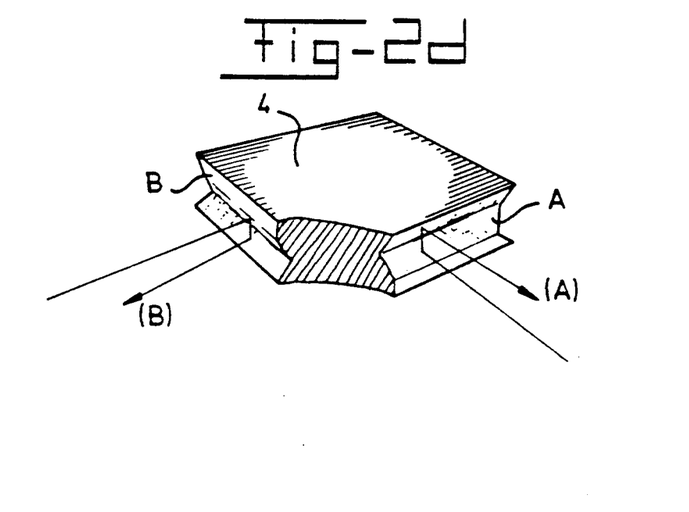

In an alternative embodiment of the device of FIG. 2, one of the polygons of FIG. 2c or 2d may be used. Again, laser beams reflected by type A facets will impinge directly upon mirrors 11-16 of mirror array 10, whereas laser beams reflected by type B facets will propagate in the direction of mirrors 17-22 of mirror array 10 after being reflected by an appropriate additional mirror (not shown).

Figure 3:
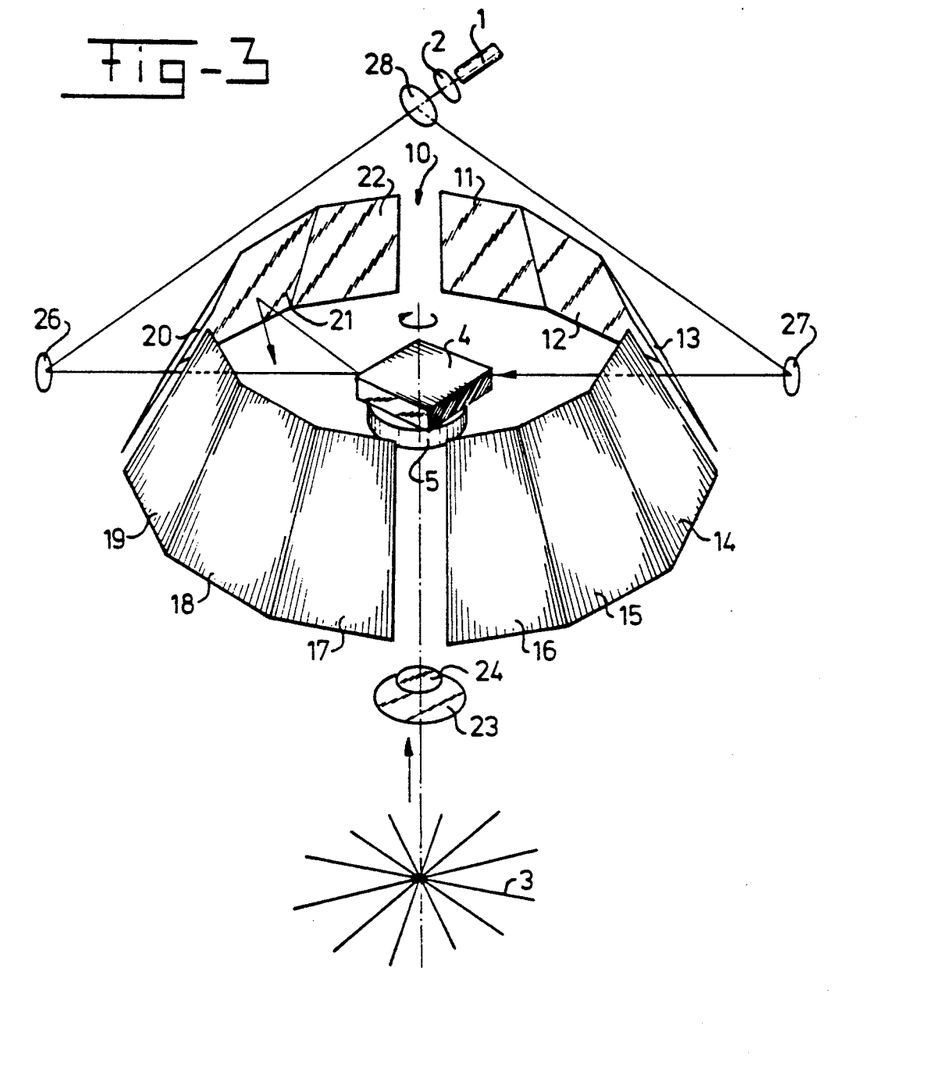
FIG. 3 shows an optical beam scanner according to the invention having symmetrical geometry.

When a symmetrical scanning pattern is required, the geometry of FIG. 3 may be used. After being focussed by beam shaper 2, the laser beam from laser source 1 is split into two parts by a beam splitter 28. One of the laser beam parts will generate a scanning pattern 3 via mirror 26, rotating polygon 4 and mirrors 17-22 of mirror array 10. The other laser beam being separated from the first one will generate its own scanning pattern via mirror 27, polygon 4 and mirrors 11-16 of mirror array 10. The polygon 4 has an even number of facets. Generally, four facets are provided, two of which are reflective and the other two being blackened and not reflective at all, as shown in FIG. 3. Always, a reflective facet will oppose a blackened facet, so that never two scanning patterns 3 will be generated simultaneously. During rotation of the polygon 4 the first laser beam and the second laser beam separated from the original laser beam, respectively, will successively generate scanning patterns 3 via mirrors 17-22 and mirrors 11-16, respectively. The light scattered from the bar code will, again, be collected by a collecting lens 23 and be detected by a detector 24, as mentioned before.

There is one disadvantage of the device according to FIG. 3: the light efficiency is low since the initial laser beam is split up into two parts, so only half of the laser power is used for scanning. This disadvantage may be overcome by the application of an optical switch or chopper. In the present invention the polygon itself may perform the function of optical switch, as will be clarified below.

Figure 4:
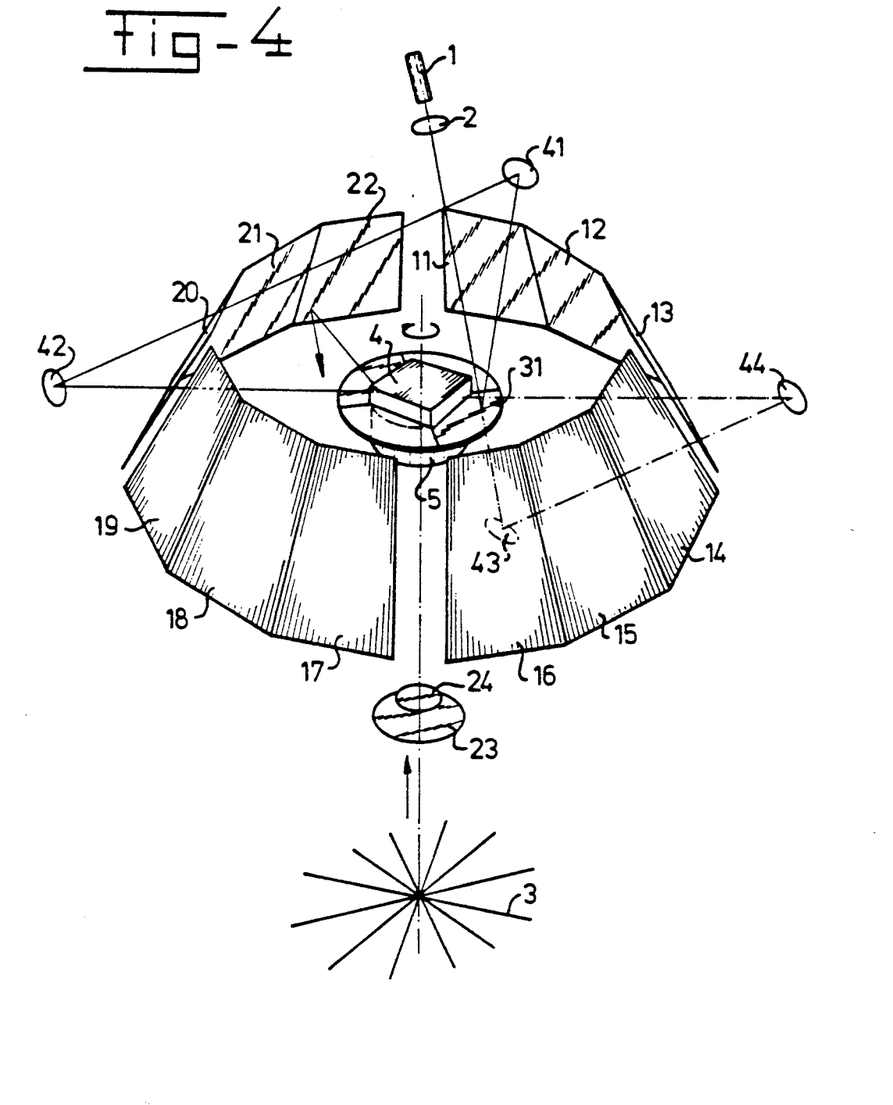
FIG. 4 shows an optical beam scanner according to the invention comprising a dual-state optical switch.
Figure 4A:
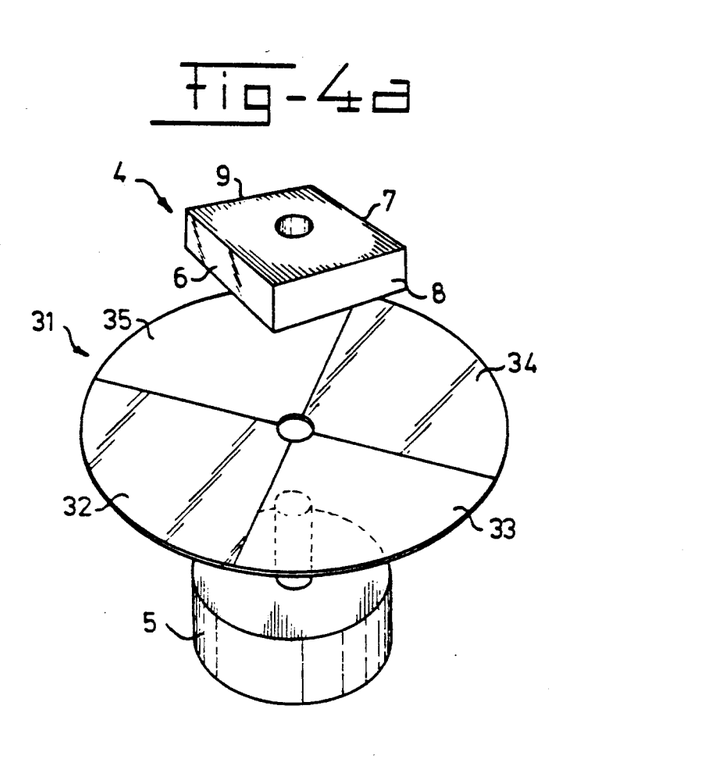
FIGS. 4a and 4b show two designs of dual-state optical switches.

FIG. 4 shows a first embodiment of an optical scanning device according to the invention having an optical chopper. To illuminate the polygon 4 from two sides with full laser beam power, polygon 4 may comprise an optical chopper disc 31 (FIG. 4, 4a) rotating with the same speed as facets 6-9. As can be clearly seen from FIG. 4a, optical disc 31 is divided into four parts of equal size, first two parts 32, 34 being reflective and opposing each other, and second two parts 33, 35 being transparent and also opposing each other. Therefore, optical disc 31 has two optical states. Optical disc 31 is fixed to polygon 4 in such a way, that every part 32, 33, 34, and 35 respectively, corresponds to one of the facets 6, 7, 8, and 9 respectively. In the situation shown in FIG. 4, a laser beam from laser source 1 after being focussed by beam shaper 2, is reflected by one of the reflecting parts of optical switch 31. Then, the reflected laser beam is reflected again by mirrors 41 and 42 and impinges upon that facet of polygon 4 that is opposite to the facet corresponding to the reflecting part of optical disc 31. By reflecting against the rotating facet and the stationary mirrors 17-22 of mirror array 10 a scanning pattern 3 will be generated.

In case the laser beam from beam shaper 2 will impinge upon one of the transparent parts 33, 35 of optical chopper 31, the laser beam will pass through the chopper and be reflected by mirrors 43 and 44. Then, the beam arriving from mirror 44 will impinge upon that facet 8, 9 of polygon 4 that corresponds to the transparent part 33, 35 through which the laser beam has passed. Now, via mirrors 11-16 a scanning pattern 3 will be generated. Light scattered from the bar code will, again, be collected and detected by collecting lens 23 and detector 24, respectively.

Figure 4B:
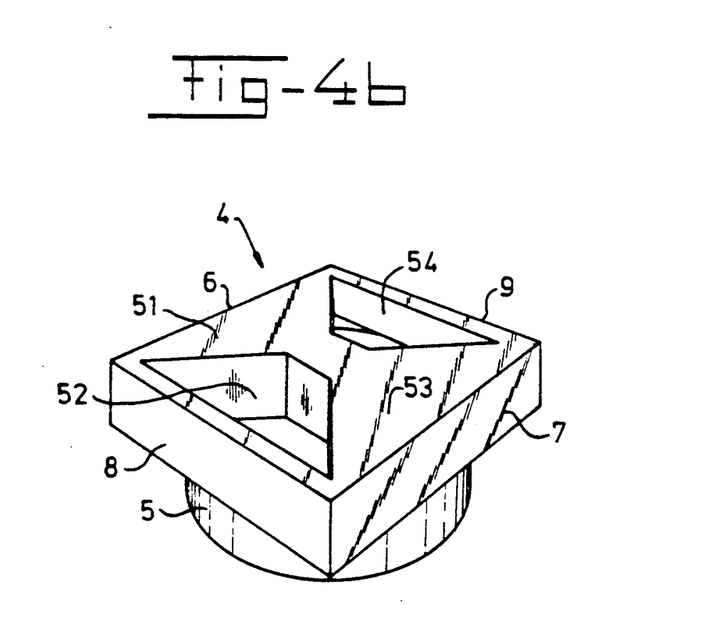

The polygon 4 may be designed in such a way that no additional chopper disc is needed. FIG. 4b shows one embodiment of such a polygon functioning as a chopper without the application of a chopper disc. The polygon 4 has four facets 6, 7, 8, and 9 and two reflecting surfaces 51, 53 in a plane perpendicular to the axis of motor 5. Polygon 4 comprises two holes 52 and 54, as indicated in FIG. 4b. By means of further mirrors (not shown) a laser beam passing through the holes 52 and 54 will impinge upon facets 8 and 9, respectively. When a laser beam is reflected by reflecting surface 51 or 53 further mirrors (not shown) will direct the laser beam to facet 6 or 7, respectively.

During one rotation over 360° of one of the polygons according to any of the FIGS. 1-4, the laser beam will scan the mirrors of the mirror array 10 twice. The scanning speed is twice the rotating speed of the polygon 4. This opens up the possibility of modifying the polygon 4 in the following way: facets 6-9 can be divided into two sets, each set having its own angle of inclination with respect to the axis of rotation. Using such a polygon, the laser beam reflected from the facets will be projected to two different directions. In each direction a separate mirror array can be installed, thus creating more possible scanning orientations on the bar code.

Figures 5, 5A:
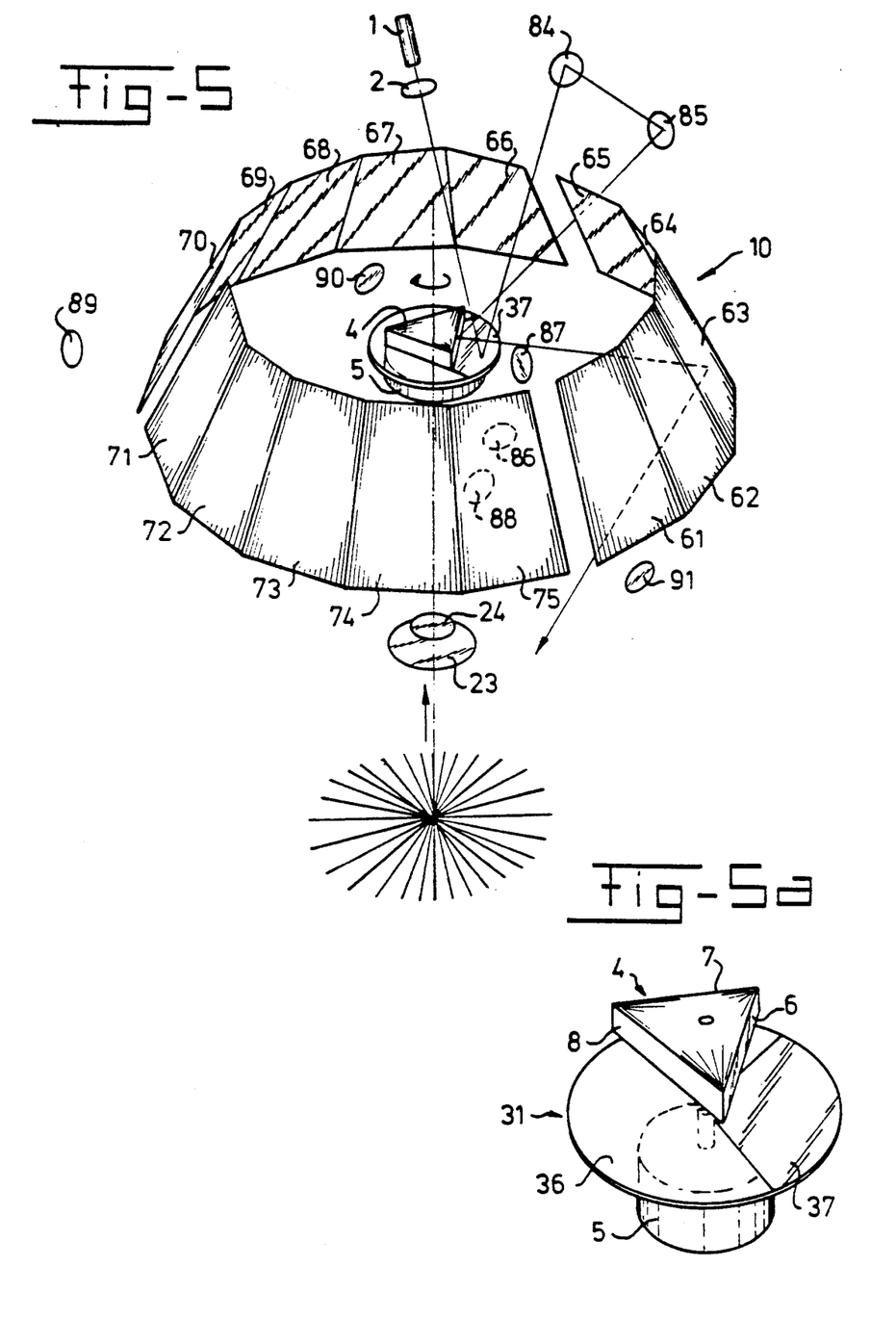
FIG. 5 shows an optical beam scanner according to the invention comprising a triple-state optical switch.
FIGS. 5a, 5b, 5c and 5d show designs of triple-state optical switches.
Figure 5B:
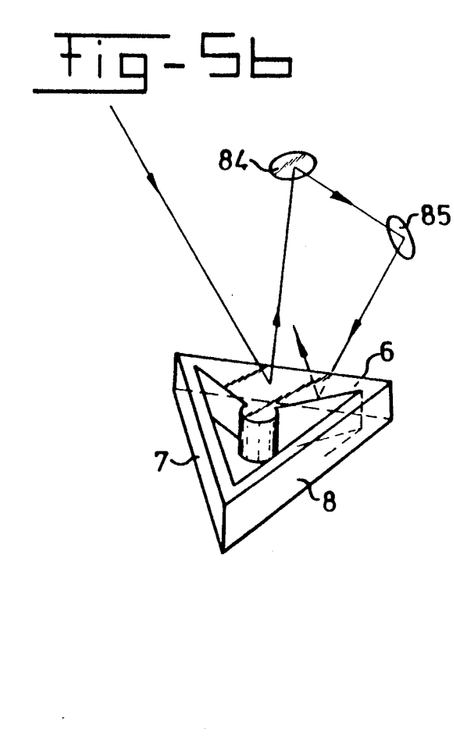
Figure 5C:
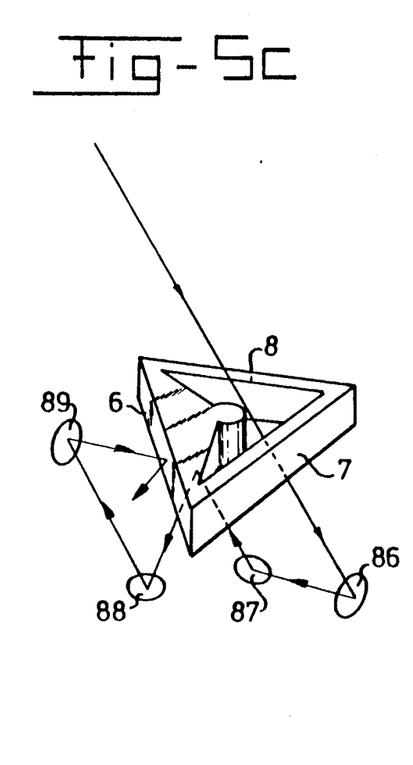
Figure 5D:
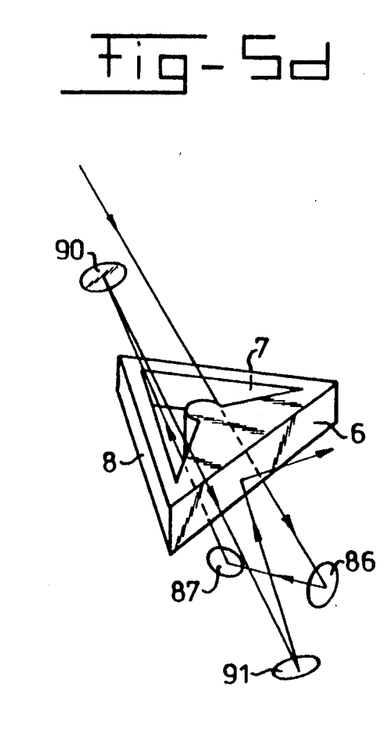

Another embodiment of the present invention is shown in FIGS. 5, 5a, and 5b. These FIGS. show the application of triple-state optical choppers. Such triple-state optical choppers may direct a laser beam to three different directions, the angle between two successive directions being, in general, $2\pi/3$. The optical chopper of FIG. 5a consists of an optical disc 31 and a polygon 4 of typically three facets 6, 7, and 8, of which at least one is reflective. The disc 31 and the polygon 4 are connected to each other and secured to the axis of motor 5. The disc 31 has a transparent part 36 covering the remaining part, i.e. $4\pi/3$ radians, of disc 31. The remaining part 37 of disc 31 is reflective.

The triple-state chopper is functioning in the following way (see FIG. 5). The laser beam incident from laser source 1 and beam shaper 2 impinges, for instance, upon reflecting part 37 and is reflected through mirrors 84 and 85 to the reflecting facet, say facet 6, of rotating polygon 4. Then, by means of mirrors 61-70 of mirror array 10, which are supposed to be covered by the scanning beam from facet 6, a scanning pattern on the bar code is generated. When the polygon 4 rotates further, the laser beam will impinge upon the transparent part 36 of disc 31. The laser beam will pass through the transparent part and be reflected by mirrors 86 and 87 to the back side of reflecting part 37, which itself is also reflective. Then, it will be reflected to mirror 88 and from there through mirror 89 to the reflecting facet 6. By means of mirrors 66-75 a scanning pattern on the bar code is generated. After further rotation, the laser beam passing through transparent part 36 and reflected by mirrors 86 and 87 will not impinge anymore upon the backside of reflecting part 37, but upon the backside of transparent part 36 itself. Then, the laser beam will pass again through the disc 31 to mirrors 90 and 91, and be directed to the reflecting facet 6 of polygon 4. After being reflected to mirrors 61–65 and 71–75 of mirror array 10 a scanning pattern on the bar code is generated. The light scattered from the bar code will be collected by a collecting lens 23 and focussed to a detector 24 to detect the bar code to be read. Since only one facet of polygon 4 is used in scanning, this polygon may be replaced by a single rotating mirror with its rotating axis parallel to its surface. In that case, the polygon (4) is degraded to its most simple structure, i.e. a polygon having only two facets of which only one is reflective.

Also here, an application without an optical disc 31 is possible, as is shown in FIG. 5b. In the polygon of FIG. 5b one part of the upper surface as well as its corresponding bottom surface is reflective and covers roughly $2\pi/3$ radians. In the other part of the upper surface a through hole covering roughly $4\pi/3$ radians is made. The additional mirrors 84–91 support the proper functioning of this triple-state chopper. The way the optical chopper of FIG. 5b functions is substantially the same as with the disc 31 of FIG. 5a, so, no further description will be needed.

Figure 6A:
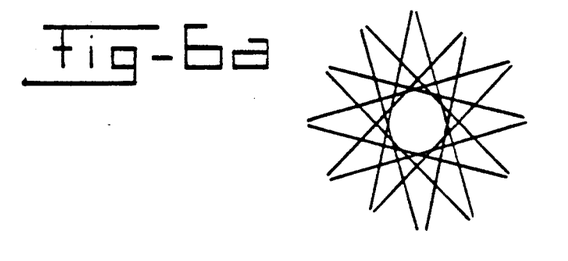
FIGS. 6a, 6b, 6c, 7a and 7b show typical scanning patterns which can be generated by the optical beam scanner according to the invention.
Figure 6B:
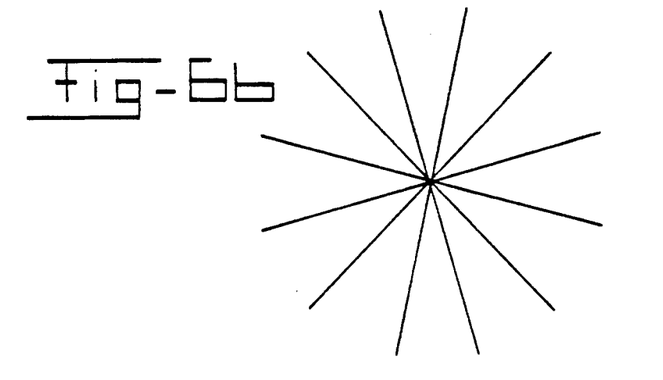
Figure 6C:
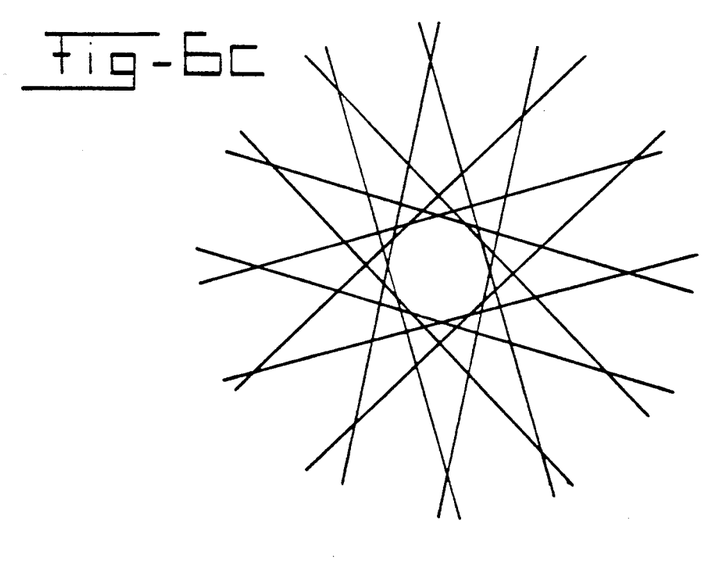

The scanning pattern on the bar code depends on the number of mirrors in the mirror array 10, the orientations of these mirrors, the polygon facets, as well as the eventual application of a chopper structure. A typical scanning pattern is a star-like pattern, as shown in the middle picture of FIG. 6.

Figure 7A:
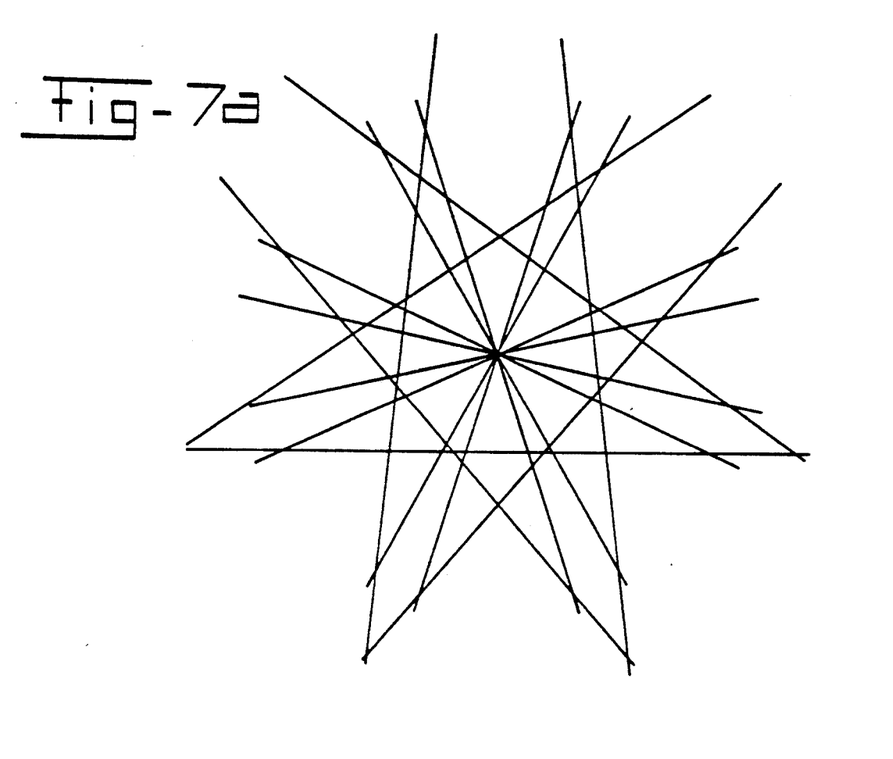
Figure 7B:
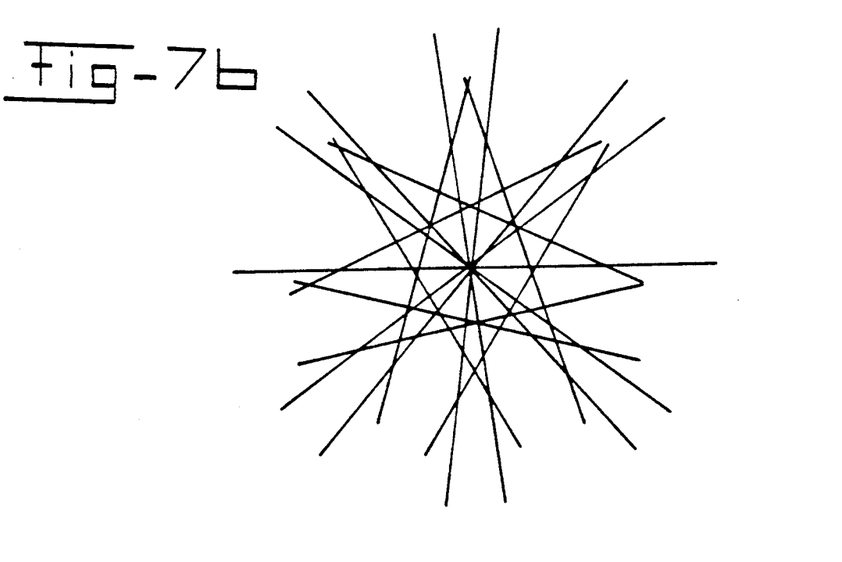

The scanning pattern generated by dual-state choppers will miss one possible orientation, i.e. the orientation of the scanning line parallel to the incident laser beam direction. A triple-state chopper avoids this disadvantage. To obtain as much orientations as possible, when using triple-state choppers an odd number of mirrors in the mirror array is preferred. A single star-like pattern in a reading plane will cause less reading opportunities in other planes surrounding the central area, since there are no scanning lines, as shown in the upper and lower pictures of FIG. 6. To optimize the reasing opportunity in different planes, a multiple star-like pattern is preferred. A typical scanning pattern for 15 mirrors in the mirror array is shown in FIG. 7. In the example of FIG. 7, two star-like scanning patterns comprising 7 and 8 scanning lines, respectively, may be defined in two separate planes.

The devices shown in the Figs. are given by way of example only. They are in no way meant as limiting the scope of the invention, as defined by the appended claims. For instance, polygons having more than four facets may be used, as well as mirror arrays having more or less mirrors than shown in the Figs. Also, if required, the initial laser beam may be separated into more than two laser beams by means of more than one beam splitter.

I claim:

1. An optical scanning system to scan a code on an object comprising:
    a laser source,
    a laser beam shaper receiving a laser beam from said laser source and focussing the laser beam on the object,
    a polygon means having at least two facets, at least one of which is reflective,
    motor means for rotating said polygon means,
    a mirror array substantially entirely surrounding said polygon means and having a first and second set of mirrors,
    said mirror array being arranged in such a way that during operation the laser beam after being reflected by said rotating polygon means and by the mirror array will generate a scanning pattern on the code to be detected, and
    a detector receiving the light scattered by the object, said polygon means being designed to direct the laser beam to said first set of mirrors in said mirror array during a first part of each rotation cycle and to direct the laser beam to said second set of mirrors of said mirror array during a second part of each rotation cycle.

2. An optical scanning system according to claim 1 wherein the polygon means comprises four facets, two of which being opposite to each other may directly reflect the laser beam impinging upon the polygon means to said first set of mirrors of said mirror array, whereas the other two facets also opposing each other comprise a passage way through which the laser beam passes when being directed to them, after which the laser beam will be reflected backwards by a first additional mirror means to one of said other two facets to scan said second set of mirrors of said mirror array.

3. An optical scanning system according to claim 1 wherein the polygon means comprises four facets, two of which being opposite to each other may directly reflect the laser beam impinging upon the polygon means to said first set of mirrors of said mirror array, whereas the other two facets also opposing each other will reflect the impinging laser beam to a first additional mirror means, reflecting the laser beam to said second set of mirrors of said mirror array.

4. An optical scanning system according to claim 3 wherein the other two facets each consist of two facet parts having a first predetermined angle of inclination with respect to each other and the first additional mirror means consists of two reflective members having a second predetermined angle of inclination with respect to each other.

5. An optical scanning system according to claim 3 wherein two facet parts of the polygon means each consist of at least two facet sub-parts having a first predetermined angle of inclination with respect to each other and the other two facets each consist of two other facet sub-parts having a second predetermined angle of inclination with respect to each other.

6. An optical scanning system according to claim 1 wherein the polygon means comprises four facets and an optical disc which disc comprises two opposing reflecting parts corresponding to two facets of the polygon means and two transparent parts corresponding to the other two facets of the polygon means, the system furthermore comprising a first and a second additional mirror to support the scanning of said first set of mirrors of said mirror array when the laser beam is reflected by one of the reflecting parts of said optical disc and comprising a third and a fourth additional mirror to support the scanning of said second set of mirrors of said mirror array when said laser beam passes through one of the transparent parts of said optical disc.

7. An optical scanning system according to claim 1 wherein said polygon means has an upper surface comprising two reflecting surface parts and two through holes through which an impinging laser beam might pass, the system furthermore comprising a first and a second additional mirror to support the scanning of said first set of mirrors of said mirror array when the laser beam is reflected by one of the reflecting surface parts of the upper surface of the polygon means and comprising a third and a fourth additional mirror to support the scanning of said second set of mirrors of said mirror array when said laser beam passes through one of the through holes of said polygon means.

8. An optical scanning system according to claim 1 wherein said polygon means comprises three facets and an optical disc rotating with the same speed as said three facets, of which at least one is reflective, a first part of the disc being reflective, covering roughly $2\pi/3$ of said disc and corresponding to one of said facets, the remaining part of said disc being transparent, the system furthermore comprising additional mirrors to support subsequent scanning of said first and second set of mirrors of said mirror array by means of the facets of said polygon means.

9. An optical scanning system according to claim 1 wherein said polygon means comprises only one reflecting facet and an optical disc rotating with the same speed as said polygon means, a first part of the disc being reflective, covering roughly $2\pi/3$ of said disc, the remaining part of said disc being transparent, the system furthermore comprising additional mirrors to support subsequent scanning of said first and second set of mirrors of said mirror array by means of said one reflecting facet.

10. An optical scanning system according to claim 1 wherein said polygon means comprises three facets of which at least one is reflective and said polygon means has an upper and bottom surface both comprising reflective parts covering roughly one third of the entire upper and bottom surface, respectively, while said polygon means comprises a through hole through said upper and bottom surface, the system furthermore comprising additional mirrors to support the subsequent scanning of said first and second set of mirrors of said mirror array by means of the three facets of said polygon means.

11. An optical scanning system according to claim 1 wherein said polygon means comprises at least four facets divided into two sets, each set having its own angle of inclination with respect to the axis of rotation of the polygon and wherein the system furthermore comprises a second mirror array and each mirror array corresponds with one set of the facets.

* * * * *